J. C. SCHAFFER.
SAND DRIER.
APPLICATION FILED APR. 29, 1912.
1,134,762.
Patented Apr. 6, 1915.
2 SHEETS—SHEET 1.
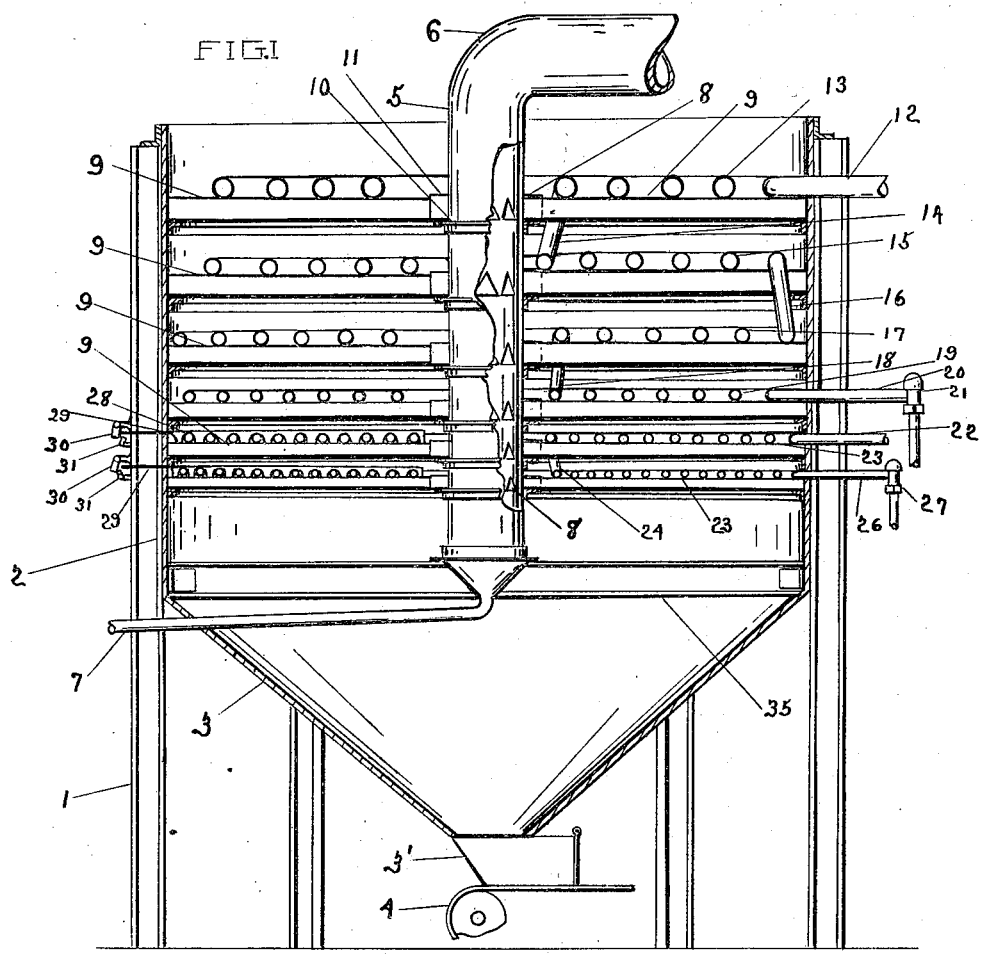
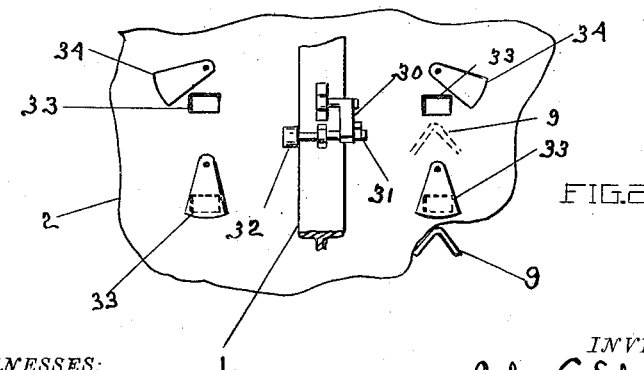
WITNESSES:
O. H. Rauch
Gladys Jamison.
INVENTOR
John C. Schaffer
BY
Geo E Kirk
ATTORNEY
THE NORRIS PETERS CO., PHOTO-LITHO., WASHINGTON, D. C.

J. C. SCHAFFER.
SAND DRIER.
APPLICATION FILED APR. 29, 1912.

1,134,762.

Patented Apr. 6, 1915.
2 SHEETS—SHEET 2.

WITNESSES:

INVENTOR
John C. Schaffer
BY
ATTORNEY

THE NORRIS PETERS CO., PHOTO-LITHO., WASHINGTON, D. C.

UNITED STATES PATENT OFFICE.

JOHN C. SCHAFFER, OF TOLEDO, OHIO.

SAND-DRIER.

1,134,762.

Specification of Letters Patent.

Patented Apr. 6, 1915.

Application filed April 29, 1912. Serial No. 693,783.

*To all whom it may concern:*

Be it known that I, JOHN C. SCHAFFER, a citizen of the United States, residing at Toledo, Lucas county, Ohio, have invented a new and useful Sand-Drier, of which the following is a specification.

This invention relates to storing and drying commodities.

This invention has utility when embodied in a bin or drier for commodities to be used as ingredients in manufacturing processes, as sand in silica brick manufacture.

Figure 3:
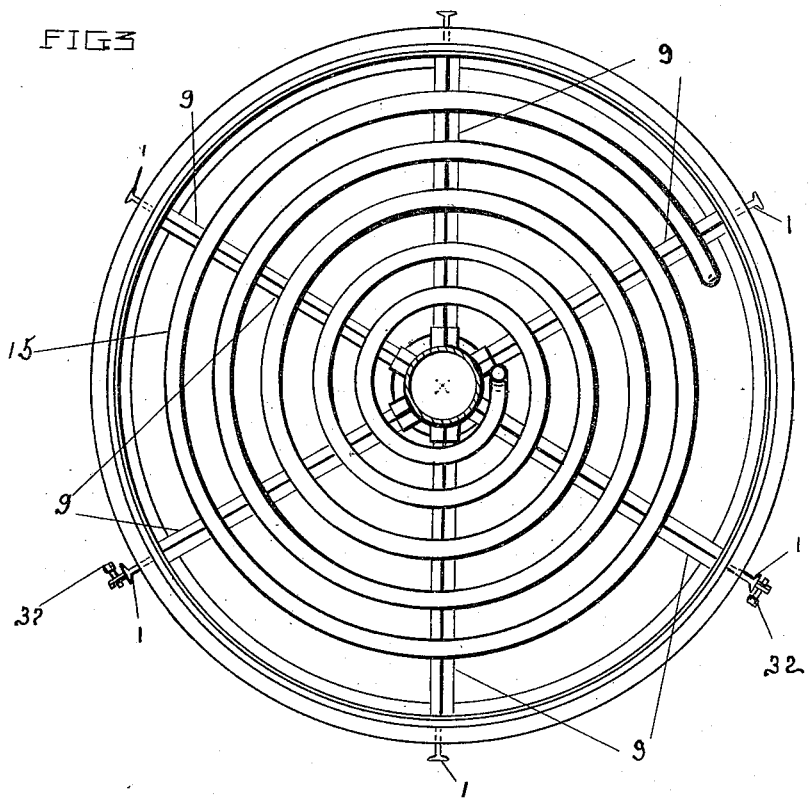
Figure 4:
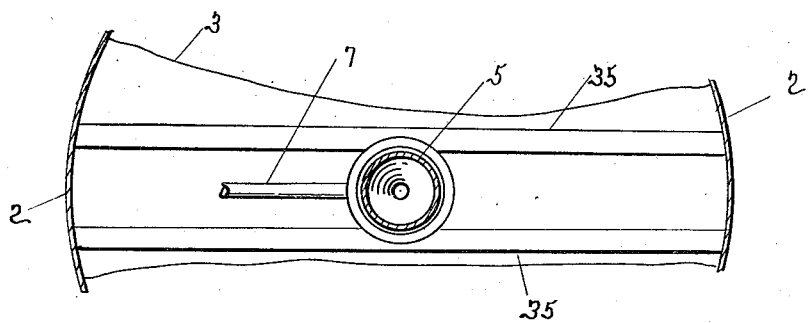

Referring to the drawings: Figure 1 is a vertical section through a bin or drier embodying the invention; Fig. 2 is a fragmentary side elevation thereof showing hand holes and knocker mechanism; Fig. 3 is a plan view of a coil in position in the bin; and Fig. 4 is a fragmentary horizontal section showing the mounting of the main vent.

The I-beam uprights 1 carry the cylindrical bin or receptacle 2 having the conical bottom 3 leading to the discharge hopper 3', from which material is removed by the endless conveyer or belt 4.

Centrally of the receptacle 2 is the main vent 5 having duct 6 extending upward therefrom to carry off the fumes and uncondensed moisture from the sand or other commodity charged into the top of the receptacle 2. The lower portion of this vent 5 has pipe 7 leading therefrom to carry off the condensed moisture and any water which may come from the material being treated. This moisture and fumes from the material enter the vent 5 through openings 8 to which they are conducted by the downwardly opening branch vents or angles 9, the inner ends of which are mounted on the angle collars 10 and held in position by the saddles 11.

To accelerate the drying or driving off of fumes and moisture, heating coils may be provided and are shown as mounted on the radiating branch vents 9. The supply pipe 12 is connected to coil 13, shown as spiral, which has drop section 14 to similar, oppositely extending coil 15, which by drop 16 extends to coil 17 having drop 18 to coil 19 discharging through pipe 20 and trap 21 its condensation. These coils may be of less spacing and smaller pipes as they work downward from the top of the receptacle 1, to thus gradually increase the intensity of heat action throughout the mass of the sand and drive the moisture and fumes upward from the coils to be trapped and carried off by the downwardly opening branch vents 9. The supply pipe 22 serves heating coil 23 connected by the drop section 24 to coil 25 having discharge pipe 26 leading to condensation trap 27. The number of coils may be regulated as to the circumference and height of the bin or receptacle, and with the duration of storage period therein, especially if the bin is used for continuous discharge. From the material adjacent these many coils, the vapor and fumes pass by means of the radiating branch vents 9 into the main vent 5, where some of the moisture condenses and runs off below, while other portions pass upward through this axial vent and off through the passage 6.

In some instances there may be a tendency to clog, according to the character of the material treated and its moisture condition when received in the drier. To overcome this action, coil engaging forks 28 may be provided with extensions 29 protruding from the receptacle adjacent the hammers 30 which are lifted by the continuously rotating arm 31 driven by pulley 32, and allowed to fall freely against the ends of the extensions 29. The concussion of these blows of freely falling mass or hammers 30 tends to loosen the sand or material and even prevent accumulation thereof on the coils. These vibrating means may be distributed to act upon different points of the same coil, as well as upon different coils. In some instances there may be accumulation of some foreign material in the receptacle, for removal of which access is obtained to the receptacle 2, through the hand holes 33, having closures 34 therefor.

The main or axial vent 5, through supporting the inner ends of the branch vents 9, which carry the coils, is mounted on the pair of I-beams 35. The structure is simple, strong and substantial, as well as effective for large capacity operation with a minimum of up-keep expense. The mass of superposed material prevents air circulation to any extent from the depths of the mass and the expansion due to heating at once drives off moisture and gases through the distributed vents.

What is claimed and it is desired to secure by Letters Patents is:

1. A drier receptacle, heating coils therein, supporting means for the coils, coil spacing means engaging the coils, and an actuator for said spacing means vibrating said coils relatively to the supporting means.

2. A drier provided with a plurality of superposed heating coils, and downwardly opening vents supporting the coils, said vents being spaced from the coil below to provide a space between the vent opening and the next lower coil for material being dried, thereby providing a free flow passage for the moisture rising from the material above the coil to enter the vent opening and be conducted away therethrough.

3. A cylindrical drier receptacle, converging downwardly opening vents therein, and a central downwardly discharging condensation duct to which said vents connect.

4. A cylindrical drier receptacle having therein an axial vent discharging upward and outward therefrom, and a condensation duct leading downward from said axial upwardly discharging vent.

5. A cylindrical drier receptacle, an axial main vent therein, radiating downwardly opening vents connected to said axial vent, and heating coils supported by said vents.

In testimony whereof I affix my signature in the presence of two witnesses.

JOHN C. SCHAFFER.

Witnesses:
C. H. RAUCH,
GEO. E. KIRK.

Copies of this patent may be obtained for five cents each, by addressing the "Commissioner of Patents, Washington, D. C."